United States Patent [19]
Liebermann

[11] 3,912,099
[45] Oct. 14, 1975

[54] SPARE TIRE CARRIER MEANS

[76] Inventor: Benno E. Liebermann, 2805 Lime Kiln Lane, Louisville, Ky. 40222

[22] Filed: June 20, 1974

[21] Appl. No.: 481,071

[52] U.S. Cl. ............... 214/453; 214/451; 296/37.2
[51] Int. Cl.² ......................................... B62D 43/04
[58] Field of Search ............ 214/453, 451; 296/37.2

[56] References Cited
UNITED STATES PATENTS

| | | | |
|---|---|---|---|
| 2,010,270 | 8/1935 | Lawrence | 296/37.2 |
| 2,494,411 | 1/1950 | Simi | 214/453 |
| 2,981,427 | 4/1961 | Walker | 214/453 X |

*Primary Examiner*—Leo Friaglia
*Attorney, Agent, or Firm*—Harry B. O'Donnell, III

[57] ABSTRACT

This invention provides spare tire carrier means for a wheeled vehicle comprising arm means pivotably connected to the vehicle by generally vertical first pivot means disposed such that the arm means can be pivoted thereabout in a generally horizontal plane between a first position adjacent to the vehicle and a second position wherein the arm means extend generally radially outwardly from the vehicle; and tire retainer means, including means to secure a tire thereto, pivotably connected to the arm means by generally horizontal second pivot means such that the tire retainer means and the tire secured thereto can be pivoted thereabout between a first position wherein the center axis of the tire lies in a generally vertical plane and second position wherein the center axis of the tire lies in a generally horizontal plane.

4 Claims, 7 Drawing Figures

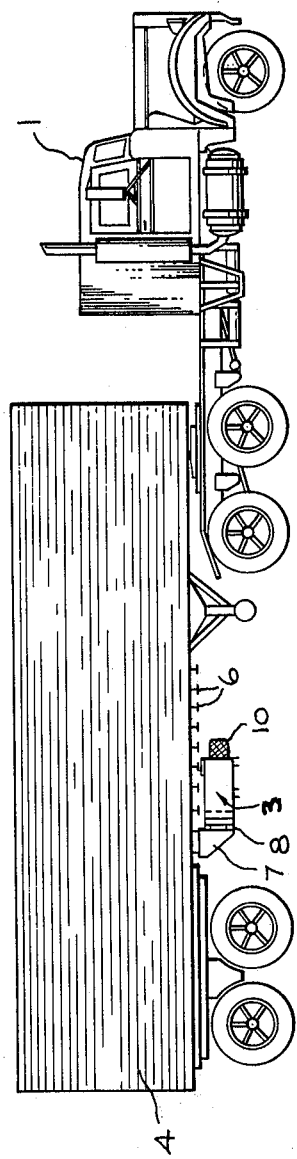
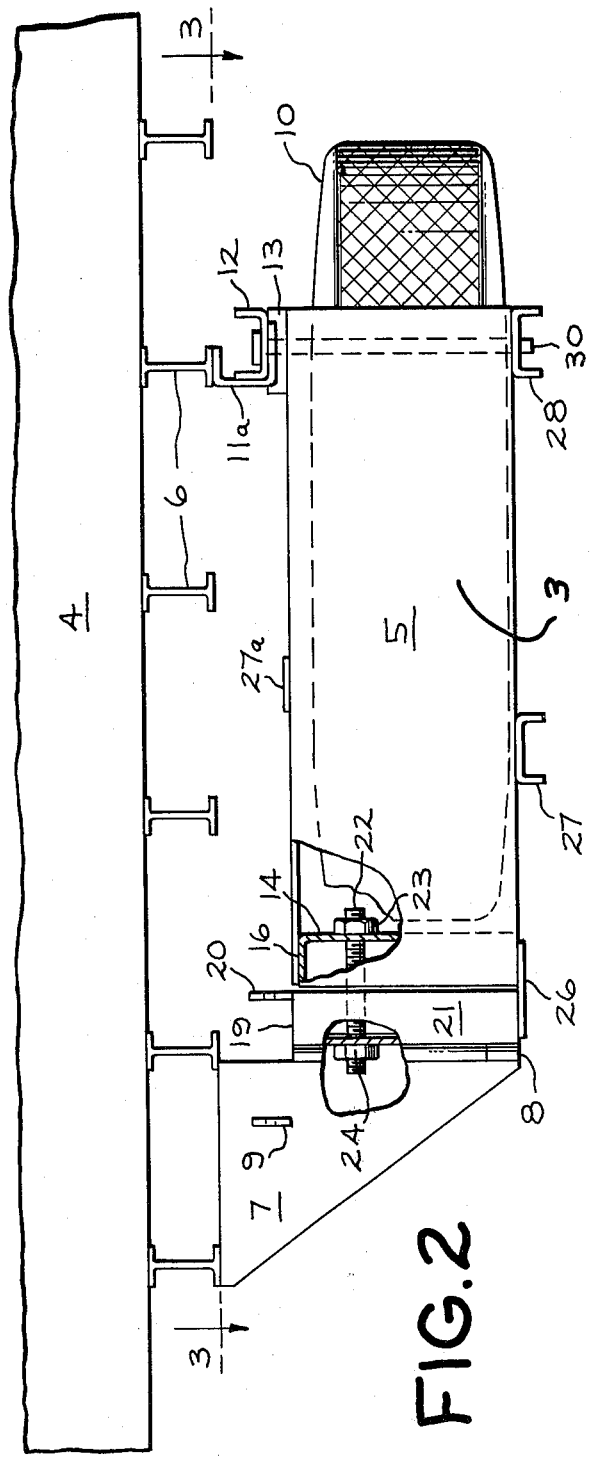

SPARE TIRE CARRIER MEANS

BACKGROUND OF THE INVENTION

The present invention provides spare tire carriage and storage means that can be used with most wheeled vehicles but which are particularly useful for storing spare tires on trucks or other vehicles that use very heavy tires.

Heretofore, various prior-art devices have been provided with means for retaining spare tires within, or adjacent to, the body of wheeled vehicles. Some such previous devices have been operated by generally complex lever mechanisms, which have been expensive to manufacture or have not been suitable for storing or handling large, heavy tires, or for removing the tires from the storage position to position for installation. Also, because of the complex arrangements provided, such previous devices have also been difficult and cumbersome to operate.

One such previous device is shown in U.S. Pat. No. 2,010,270, while another previous device is shown in U.S. Pat. No. 2,091,076. Both employ means for retaining a spare tire within a vehicle, wherein complex pivotable arms and linkage means are provided for swinging the tire, which is stored in the trunk of a vehicle, to a generally vertical position adjacent to the ground, so that the tire can be removed for installation on the vehicle. Both of these two old devices require considerable manual physical effort to remove the tire from the storage position to another position wherein it can be removed for installation on the vehicle. Accordingly, they lack utility in connection with the storage and removal of very heavy tires, for example truck tires.

Other previous devices, for example those shown in U.S. Pat. Nos. 2,034,834, and 3,210,117, utilize means for storage of a spare tire within or beneath the frame of a vehicle, wherein the spare tire is stored in a "drawerlike" apparatus, and is removed from the storage position by pulling the retaining means from under the vehicle. With these other two old patented devices, the stored tire can be pivoted outwardly from the vehicle after the retainer means has been pulled from beneath the vehicle in a generally horizontal plane. However, with both of these latter two old devices, the tire must be manually removed from the retainer means and placed on the ground for installation on the vehicle and, it is also necessary to manually lift the tire which has been removed from the vehicle axle in order to place it into the carrier.

It will be recognized that these aforenoted previously patented devices have failed to provide an arrangement useful for storage of heavy tires, such as truck tires, and do not teach a storage arrangement to facilitate replacement of a heavy tire in the storage means without manually lifting the tire into the storage position.

SUMMARY OF THE INVENTION

The present invention provides straightforward and economically constructed tire carrier means adapted to be carried by a wheeled vehicle that are particularly useful in storing and securely locking and thereby preventing theft of a heavy tire and wherein both removal of the spare tire from the carrier means and subsequent placement of the tire, which has been removed from the axle, into the carrier means can be equally easily accomplished by one person.

Moreover, the tire carrier means provided by the present invention, requires only a minimal space for storage of the spare tire during normal operation and is easily moved from the position where the spare tire is stored during operation of the vehicle, to the position for removal of the spare tire from storage to the ground. Moreover, the present invention provides means wherein the spare tire is positioned away from the vehicle in a generally vertical position prior to removal from the carrier at a location closely adjacent to the ground prior to removal from the carrier, so that it is not necessary to manually lift or otherwise physically move the tire a significant vertical or horizontal distance during its removal from the carrier.

One presently preferred embodiment provided by the present invention to store spare tire carrier means for use on a wheeled vehicle includes: arm means pivotably connected to the vehicle by generally vertical first pivot means disposed such that the arm means can be pivoted thereabout in a generally horizontal plane between a first position adjacent to the vehicle and a second position extending generally radially outwardly from the vehicle; and tire retainer means, including means to secure a tire thereto, pivotably connected to the arm means by generally horizontal second pivot means such that the tire retainer means and the tire secured thereto can be pivoted thereabout between a first position wherein the center axis of the tire is in a generally vertical plane and a second position where the center axis of the tire is in a generally horizontal plane.

BRIEF DESCRIPTION OF THE DRAWINGS

The present invention is illustrated in the accompanying drawings, wherein:

FIG. 1 is a side elevational view of a wheeled vehicle employing a presently preferred form of the spare tire carrier means provided in accordance with the present invention;

FIG. 2 is a greatly enlarged, fragmentary view, in side elevational and partially in section, of the FIG. 1 form of the spare tire carrier means provided in accordance with the present invention;

DETAILED DESCRIPTION

Figure 3:
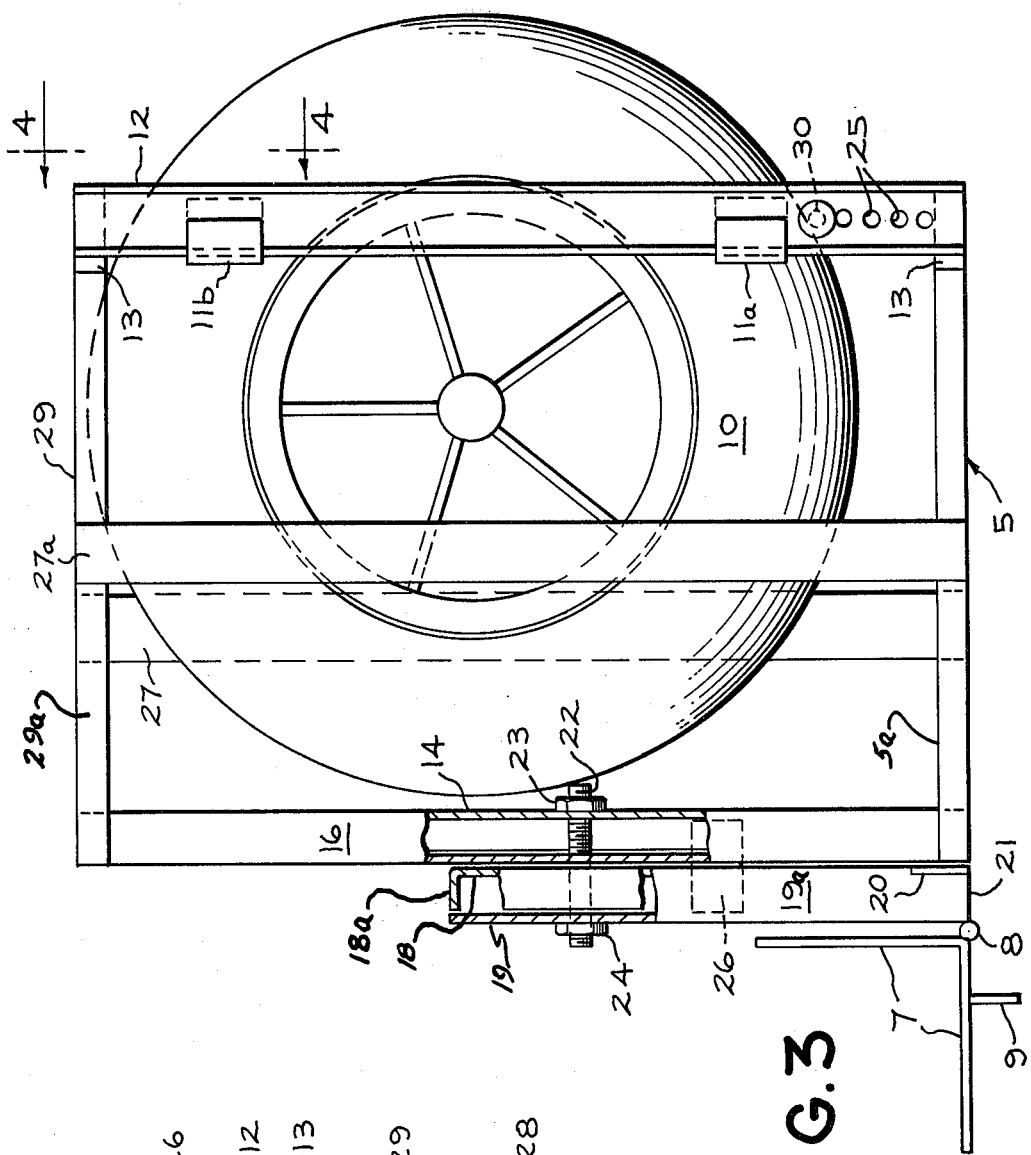
FIG. 3 is a view taken along line 3—3 of FIG. 2.

Turning now to the drawings, and more particularly to FIG. 1 thereof, there is illustrated a wheeled vehicle, a rig comprising a detachable trailer 4 pulled by a motorized tractor 1, employing a presently preferred form of the spare tire carrier means provided in accordance with the present invention. As illustrated, the spare tire carrier means comprises a tire retainer 3 to carry a spare tire 10 for either the trailer 4 or the tractor 1, which is pivotably connected to the trailer 4 by generally vertical first pivot means comprising a hinge 8 that is connected to a bracket 7 which is fixed to the trailer 4 such that the tire retainer 3 can be carried and stored beneath the floor or bed of the trailer 4.

As best shown in FIGS. 1 and 2, the bracket 7 is fixed, as by welding, to floor joists 6 of the trailer 4 and the vertical hinge or first pivot means 8 is connected to an edge of the bracket 7. The hinge 8 is also connected to an arm 21 which is, in turn, pivotably connected to the tire retainer 3 by generally horizontal second pivot means 22 that are described in more detail hereinafter.

More particularly, as best shown in FIGS. 2 and 3, the hinge 8 is connected to the arm 21 which includes spaced, parallel, elongate sidewalls 18 and 19. As best shown in FIG. 3, the sidewalls 18 and 19 are the webs of two interlocking channel members cooperatively assembled to form the arm 21, wherein the flanges 19a of the channel member whose web provides the sidewall 19 form the top and bottom (not shown) of the arm 21. Likewise, the flanges 18a of the channel member whose web forms the sidewall 18 of the arm 21 can advantageously provide closure means for the ends of the arm 21 and can engage the sidewall 19, as shown, to maintain the desired separation between the sidewalls 18 and 19, such that the arm 21 is a fully enclosed, hollow, structure.

Figure 4:
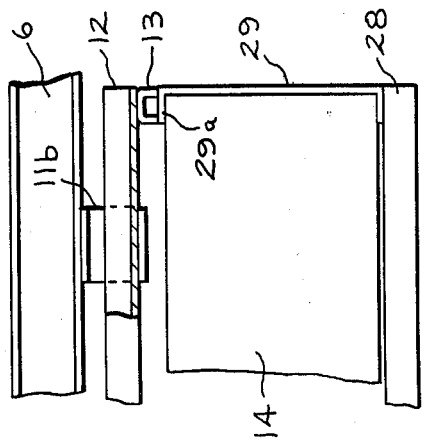
FIG. 4 is a fragmentary view taken along line 4—4 of FIG. 3.
Figure 5:
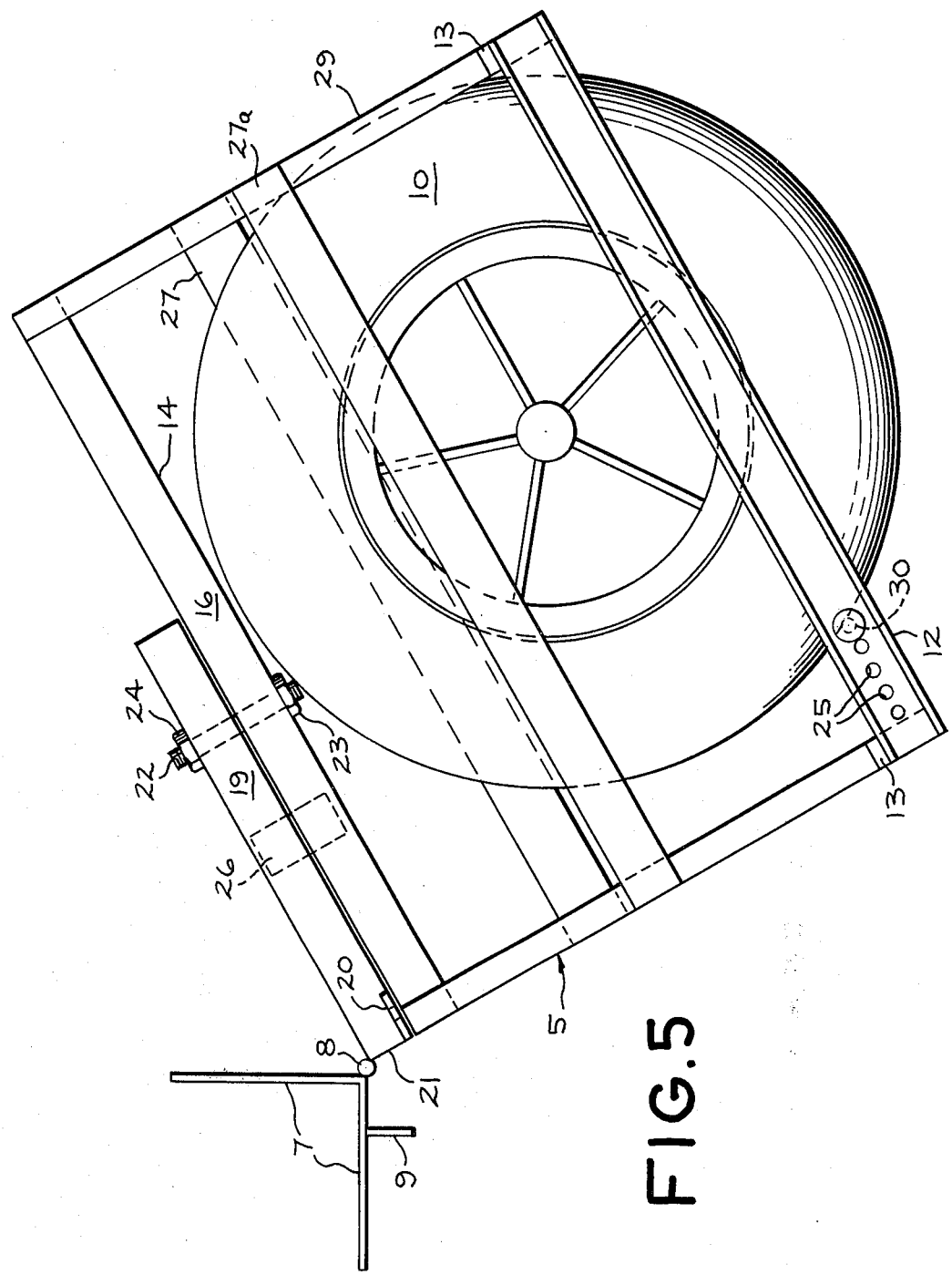
FIG. 5 is a view similar to FIG. 3, but showing the tire retainer means having been pivoted to a position extending generally radially outwardly from the vehicle.
Figure 6:
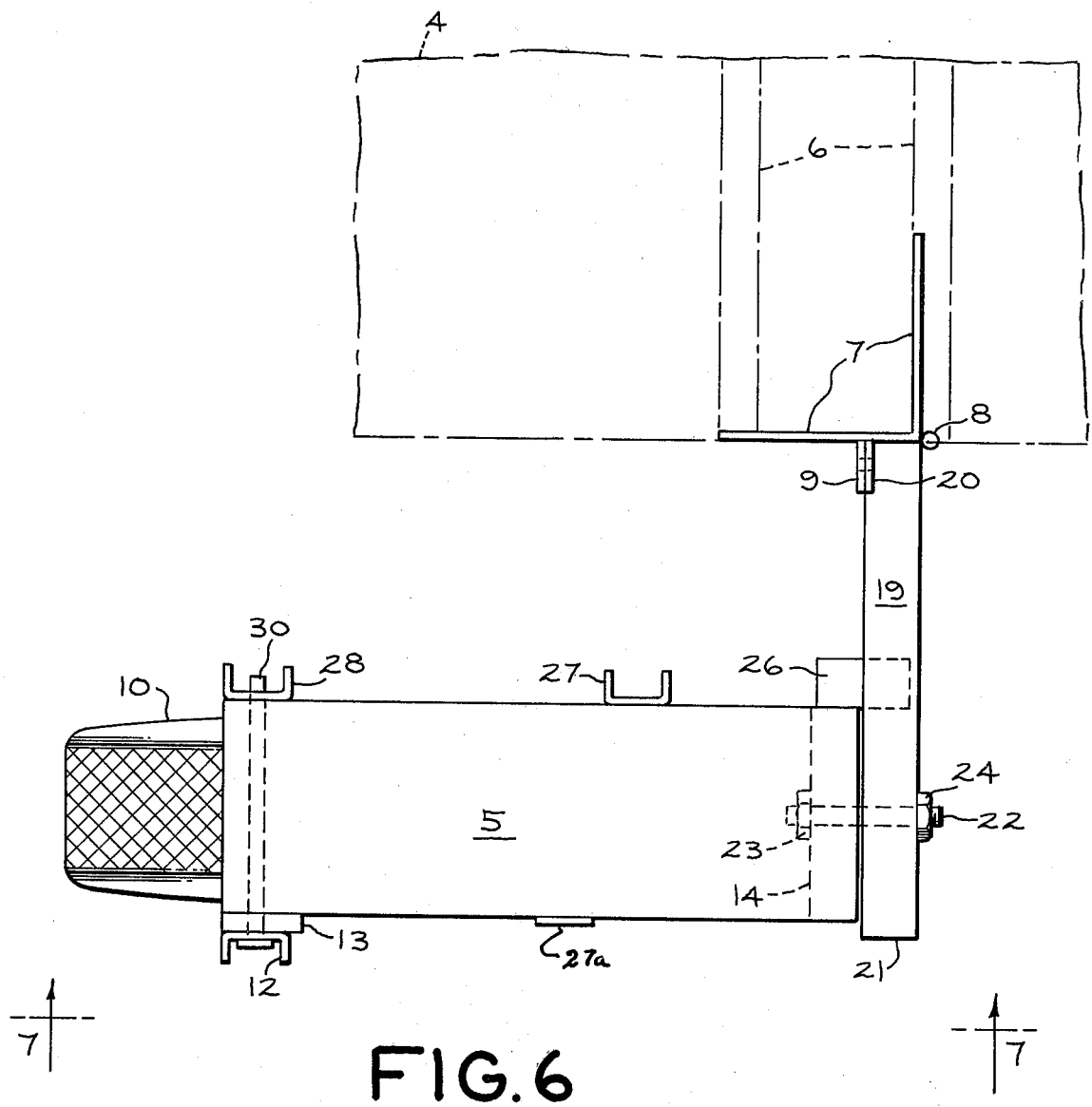
FIG. 6 is a view similar to FIG. 5, but showing the tire retainer means having been pivoted to a generally vertical position.
Figure 7:
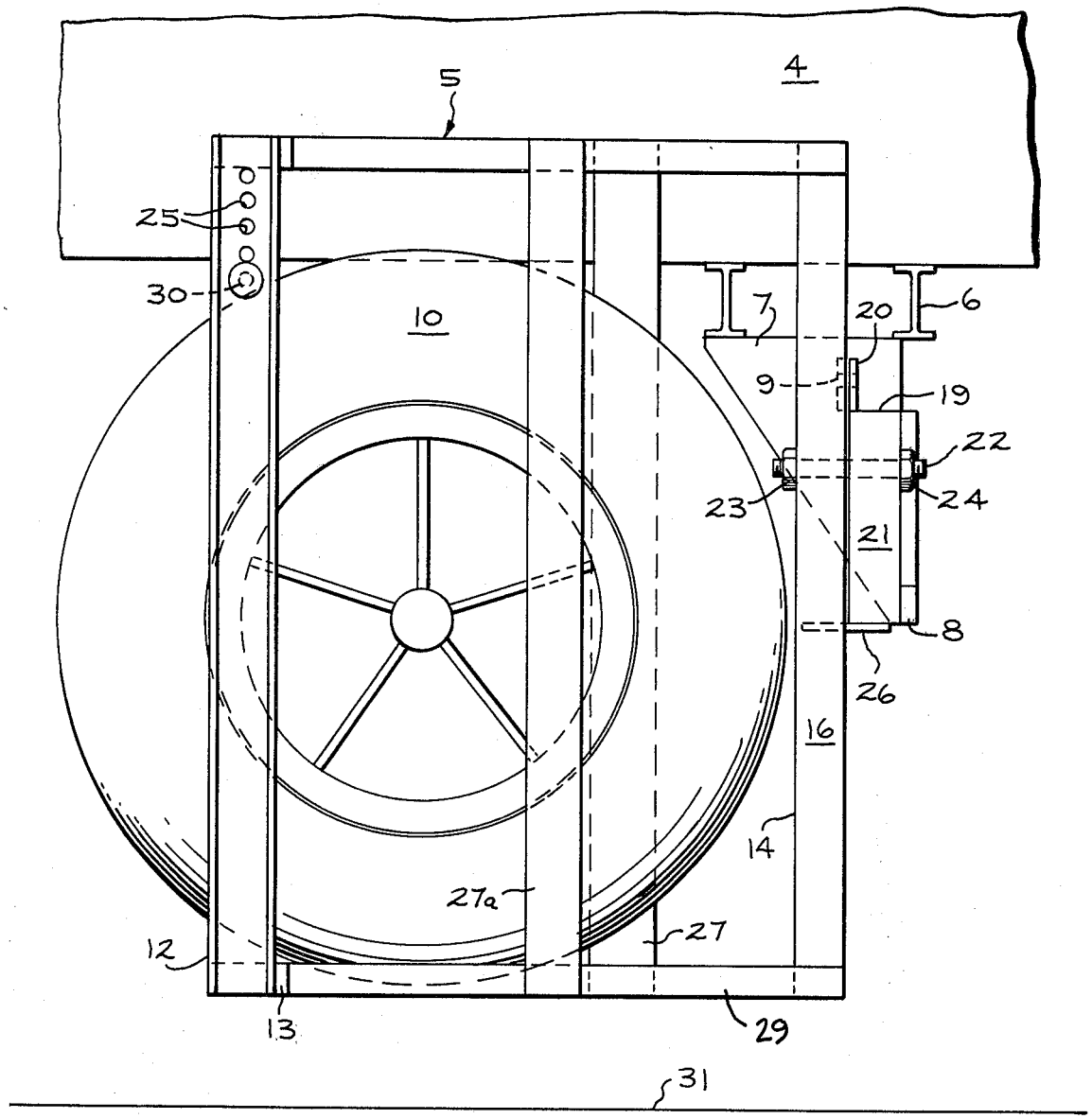
FIG. 7 is a view taken along line 7—7 of FIG. 6.

As further best shown in FIGS. 2 and 3, the arm 21 is pivotably connected to the hinge or first pivot means 8 for pivotable movement thereabout in a generally horizontal plane from a first or storage position adjacent to and beneath the floor of the trailer 4 (FIGS. 1–4) to a second position extending generally radially outward from the trailer 4 (FIGS. 5–7). A first cooperative stop member 20 is provided at the upper edge of the arm 21, as shown, to engage a second cooperative stop member 9 selectively disposed on the bracket 7 to thus limit pivotal movement of the arm 21 in a generally horizontal plane about the generally vertical hinge or first pivot means 8.

Within the scope of the present invention, various tire retaining means may be used to secure the spare tire 10. In the illustrated form of the present invention the tire retainer 3 comprises an open frame. As best shown in FIG. 3, the tire retainer 3 includes a base frame member 16 which can be fabricated from mutually parallel, spaced apart, elongate wall members 14 to provide structural stability to the base frame member 16. Likewise, frame wall members 5 and 29 which, as illustrated, can be channel-shaped cross-sections can be provided to extend laterally from the base frame member 16 in spaced apart, mutually parallel relationship, to form an open ended enclosure adapted to receive the tire 10 of various selected diameters. As best shown in FIG. 4, the wall member 29 can be disposed such that its flange members 29a extend inwardly into the enclosure defines by the frame members 5 and 29 and the base frame member 16. Likewise, the wall frame member 5 can, advantageously, be positioned such that its flanges 5a extend inwardly into the enclosure formed by the frame wall members 5 and 29 and the base frame member 16.

As shown in FIGS. 2–3 and 5–7, the arm 21 and the tire retainer base frame member 16 can be pivotably connected together by the generally horizontal second pivot means 22, such as the illustrated bolt or pivot pin, which extends through cooperative aligned apertures (now shown) which pierce the arm 21 and the tire retainer base frame member 16. Nuts 23 and 24 are provided at the opposite ends of the illustrated pivot pin or bolt 22 to secure the ends thereof in the apertures which pierce the arm 21 and tire retainer base frame member 16. It will be recognized that the pivot pin or bolt 22 provides the generally horizontal second pivot means about which the tire retainer means 3 and the tire 10 secured thereto can be pivoted between a first position wherein the center axis of the tire 10 lies in a generally vertical plane (FIGS. 1–5) and a second position wherein the center axis of the tire 10 lies in a generally horizontal plane (FIGS. 6 and 7).

As best illustrated in FIGS. 2–4 spacer blocks 13 can be provided at the top side of the tire retainer frame wall members 5 and 29 at the ends thereof disposed farthest from the tire retainer base frame member 16. And, an elongate support member 12 can be affixed, as by welding, to each spacer block 13 such that the support member 12 extends from the tire retainer 3. A second elongate support member 28 can also be fastened, as by welding, to the opposite sides of the frame members 5 and 29 to extend therebetween such that the two support member 12 and 28 and the ends of the tire retainer frame members 5 and 29 define an opening through which the tire 10 to be retained within the tire retainer 3 can be received and withdrawn.

As further shown in FIGS. 2 and 3 locking hooks 11a and 11b are preferably provided in a spaced apart relationship on selected ones of the trailer floor joists 6 to receive the support member 12 in a locking engagement when the tire retainer 3 is located in its storage position (FIGS. 1–4) beneath the trailer 4 and to provide vertical support for the tire retainer 3 when so located.

As best shown in FIG. 3, plural cooperative spaced apart apertures 25 are located in the two support members 12 and 28 of the frame of the tire carrier 3 in an aligned relationship. These apertures are disposed in a spaced apart relationship along a selected portion of the length of the two tire retainer frame support member 12 and 28, such that when a retainer pin 30 is inserted within an aligned pair thereof, the retainer pin 30 will be disposed adjacent to the edge of the tire 10 to thus retain it tightly within the frame of the tire retainer 3. As illustrated, several sets of these aligned apertures 25 are provided to advantageously permit the selection of different positions for location of the retainer pin 30 therein in accordance with the differences in diameters of the tire 10 desired to be retained within the frame of the tire retainer 3.

As further shown in FIGS. 2–3 and 5–7, additional supports 27 and 27a are preferably connected to the tire retainer frame members 5 and 29 at selected positions on opposite sides thereof. The support 27 provides a rest to support and retain the tire 10 in the frame of the tire retainer 3 when the same is located in a horizontal position (FIGS. 1–5) whereas both of these two supports 27 and 27a act to retain the tire 10 in the frame of the tire retainer 3 when the same is located in a vertical position (FIGS. 6 and 7). They further serve to provide a most important safety feature by preventing ejection of the rim of the tire 10 by explosion during inflation thereof which has, in the past, been a great hazard and has caused many serious injuries and deaths.

Rotation of the tire retainer 3 about the generally horizontal second pivot means or bolt 22 is limited by a bracket 26, as shown in FIGS. 2 and 6, which can be carried by the arm 21 and advantageously disposed to engage the lower surface of the base frame member 16 when the tire retainer 3 is pivoted to its horizontal position (FIGS. 1–5), such that rotation of the tire retainer in that first direction is thus limited. This bracket 26 is likewise disposed to engage the upper surface of the base frame member 16 of the tire retainer 3 when the same is rotated to its generally vertical position (FIGS. 6 and 7) and thus limit rotation of the tire retainer in the opposite direction.

Referring to FIG. 5 which shows the tire retainer 3 and arm 21 pivoted about the generally vertical first pivot means or hinge 8 to a position extending generally outwardly from the trailer 4, it will be further noted that the stop 9 is advantageously disposed to engage the stop 20 of the arm 21 to limit such pivotable movement.

Referring also to FIGS. 6 and 7, it will be noted that the tire retainer 3 is shown pivoted about the generally horizontal second pivot means or bolt 22, such that the frame of the tire retainer 3 is in a generally vertical position with the tire retainer frame member 29 located in a position near ground level. From these illustrations, it will be recognized clearance between the ground level 31 and the tire retainer frame member 29 is determined by the position of the pivot pin or bolt 22 with respect to the tire retainer base frame member 16, such that by proper selection of the position of the second pivot means or bolt 22 the member 29 of the frame of the tire retainer 3 can be positioned at the ground level 31 or at any selected distance above the ground level 31 to facilitate removal from or insertion of the tire 10 into the frame of the tire retainer 3.

In operation, the tire 10 is stored in the frame of the tire retainer 3 and retained therein by the retainer pin 30. The tire retainer 3 is disposed as shown in FIGS. 1–3, in its stored position beneath the trailer 4, until it is necessary to remove it.

When it is necessary to remove the tire 10, the tire retainer 3 is first unlocked from the locking brackets 11a and 11b. Then, the arm 21 carrying the tire retainer 3 is pivoted about the generally vertical first pivot means or hinge 8 away from the trailer 4, as shown in FIG. 5, until the stop 20 engages the stop 9 (FIG. 6). Next, the tire retainer 3 is pivoted about the generally horizontal second pivot means or bolt 22 to its generally vertical position (FIGS. 6 and 7), wherein the stop 26 engages one side of the tire retainer 3. When the tire retainer 3 is in its generally vertical position (FIGS. 6 and 7) wherein the center axis of the tire 10 is generally horizontally disposed, the weight of the tire 10 rests primarily on frame member 29 of the frame of the tire retainer 3.

Now, the retainer pin 30 is removed from the apertures 25 to release the tire 10 from the frame of the tire retainer 3 and the tire 10 is simply manually rolled out of the frame of the tire retainer 3 and onto the ground 31 for installation on the vehicle. Then, the second tire, which has just been removed from the vehicle axle, can, with very little effort, be simply rolled into the now empty frame of the tire retainer 3. The retainer pin 30 is re-inserted into the proper apertures 25 to secure engagement of this second tire into the tire retainer 3.

Now, the tire retainer 3 is pivoted about the second pivot means or bolt 22 to its horizontal position (FIG. 5) until it engages the stop 26 wherein the center axis of the second tire is then disposed in a generally vertical plane.

Finally, the arm 21 is pivoted about the generally vertical first pivot means or hinge 8 to its first or storage position (FIGS. 1–4) beneath the trailer 4 wherein the hooks 11a and 11b are re-joined in locking engagement with the support 12 to secure the tire retainer 3 in locking engagement beneath the trailer 4.

While it should be apparent that while there has been described what is presently considered to be preferred embodiment of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of the present invention.

What is claimed is:

1. Spare tire carrier means for a wheeled vehicle comprising:
    a. arm means pivotably connected to said vehicle by generally vertical first pivot means disposed such that said arm means can be pivoted thereabout in a generally horizontal plane between a first position adjacent to said vehicle and a second position wherein said arm means extends generally radially outwardly from said vehicle;
    b. tire retainer means providing means to secure a selected tire thereto; and
    c. generally horizontal second pivot means to pivotably connect said arm means and said tire retainer means such that said tire retainer means can be pivoted thereabout between a first position wherein the central axis of said tire is in a generally vertical disposition and a second position wherein the central axis of said tire means is in a generally horizontal disposition,
    d. said tire retainer means comprising:
        i. frame means including cooperative frame members of selected width defining an enclosure to surround a portion of the periphery of said tire retainer means and terminating at spaced apart wall frame ends to provide a cooperative opening to said enclosure wherein the width of said opening between said frame ends is greater than the diameter of said tire to be received by said enclosure; and
        ii. tire fastener means to selectively retain said tire within said enclosure.

2. The invention of claim 1 wherein said tire fastener means includes at least two elongate support members disposed in spaced, generally parallel, relationship wherein each elongate support member extends from one said frame end to the other said frame end to define there between an opening to said enclosure.

3. The invention of claim 2 wherein:
    a. each of said elongate, spaced, generally parallel support members has at least one cooperative aperture located between the ends thereof in mutually aligned relationship; and
    b. retainer pin means is provided to be received by said cooperative apertures to extend across said opening defined by said elongate support members from one said elongate member to another elongate member to retain said tire means in said frame means.

4. The invention of claim 3 wherein said retainer pin means is carried by said frame means.

* * * * *